United States Patent
Verrat-Debailleul et al.

(10) Patent No.: US 10,300,847 B2
(45) Date of Patent: May 28, 2019

(54) ILLUMINATED GLASS PANEL

(71) Applicant: SAINT-GOBAIN GLASS FRANCE, Courbevoie (FR)

(72) Inventors: Adèle Verrat-Debailleul, Villers-sur-coudun (FR); Pascal Bauerle, Roye (FR); Christophe Kleo, Attichy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 51 days.

(21) Appl. No.: 14/425,954

(22) PCT Filed: Sep. 5, 2013

(86) PCT No.: PCT/FR2013/052045
§ 371 (c)(1),
(2) Date: Mar. 4, 2015

(87) PCT Pub. No.: WO2014/037671
PCT Pub. Date: Mar. 13, 2014

(65) Prior Publication Data
US 2015/0291089 A1 Oct. 15, 2015

(30) Foreign Application Priority Data
Sep. 6, 2012 (FR) ...................... 12 58312

(51) Int. Cl.
*B60Q 3/00* (2017.01)
*F21V 8/00* (2006.01)
(Continued)

(52) U.S. Cl.
CPC .............. *B60Q 3/51* (2017.02); *B60Q 3/208* (2017.02); *B60Q 3/64* (2017.02); *G02B 6/005* (2013.01)

(58) Field of Classification Search
CPC .... B60Q 3/004; B60Q 3/0203; B60Q 3/0213; G02B 6/005
See application file for complete search history.

(56) References Cited

U.S. PATENT DOCUMENTS 4,792,884 A * 12/1988 Suman .................. B60J 3/0282
362/135
6,986,600 B2 * 1/2006 Yamada ................. B60Q 3/004
362/560

(Continued)

FOREIGN PATENT DOCUMENTS

CN 1172040 A 2/1998
DE 201 05 546 U1 10/2001

(Continued)

OTHER PUBLICATIONS

International Search Report issued for International Patent Application No. PCT/FR2013/052045, dated Dec. 13, 2013.

(Continued)

*Primary Examiner* — Jong-Suk (James) Lee
*Assistant Examiner* — Eric T Eide
(74) *Attorney, Agent, or Firm* — Pillsbury Winthrop Shaw Pittman LLP

(57) ABSTRACT

A lighting glazing includes a first sheet of transparent glass or plastic with a first main face, a second main face and a rim; a flat waveguide with a first main face, a second main face, an injection rim and a beveled rim, opposite the injection rim; a light source positioned facing the injection rim of the flat waveguide, the flat waveguide being fixed via the second main face to the first main face of the first sheet of glass.

26 Claims, 1 Drawing Sheet

(51) Int. Cl.
  *B60Q 3/51* (2017.01)
  *B60Q 3/64* (2017.01)
  *B60Q 3/208* (2017.01)

(56) References Cited

U.S. PATENT DOCUMENTS

| | | | |
|---|---|---|---|
| 7,802,903 | B1 | 9/2010 | Wray |
| 2003/0026105 | A1 | 2/2003 | Becher et al. |
| 2008/0232133 | A1* | 9/2008 | Segawa ............... G02B 6/002 362/610 |
| 2009/0316433 | A1* | 12/2009 | Shim .................. G02B 6/0038 362/613 |
| 2010/0014315 | A1* | 1/2010 | Fujimoto ............... G02B 6/001 362/615 |
| 2010/0117405 | A1* | 5/2010 | Kimizuka ............. B60J 7/0015 296/214 |
| 2010/0214795 | A1* | 8/2010 | Salter ................... B60Q 3/004 362/488 |
| 2011/0267833 | A1* | 11/2011 | Verrat-Debailleul ...................... B32B 17/10036 362/545 |
| 2012/0104790 | A1 | 5/2012 | Plavetich et al. |
| 2013/0129282 | A1* | 5/2013 | Li ........................ G02B 6/0018 385/43 |
| 2013/0224436 | A1* | 8/2013 | Kim ........................... C09J 4/00 428/141 |

FOREIGN PATENT DOCUMENTS

| | | |
|---|---|---|
| DE | 10 204 359 B4 | 5/2005 |
| DE | 10 2007 013 627 A1 | 9/2008 |
| EP | 0 823 587 A1 | 2/1998 |
| EP | 1 903 359 A2 | 3/2008 |
| JP | S54-101091 U | 7/1979 |
| JP | H01-152406 U | 10/1989 |
| JP | 2006-302607 A | 11/2006 |
| WO | WO 2010/097110 A1 | 9/2010 |
| WO | WO 2011/037884 A1 | 3/2011 |

OTHER PUBLICATIONS

Reichelt Elektronik: "Katalog 06.1/2011," Reichelt Elektronik Katalog, vol. 06.1/2011, Jun. 30, 2011, pp. 486-487, XP-002717199.

* cited by examiner

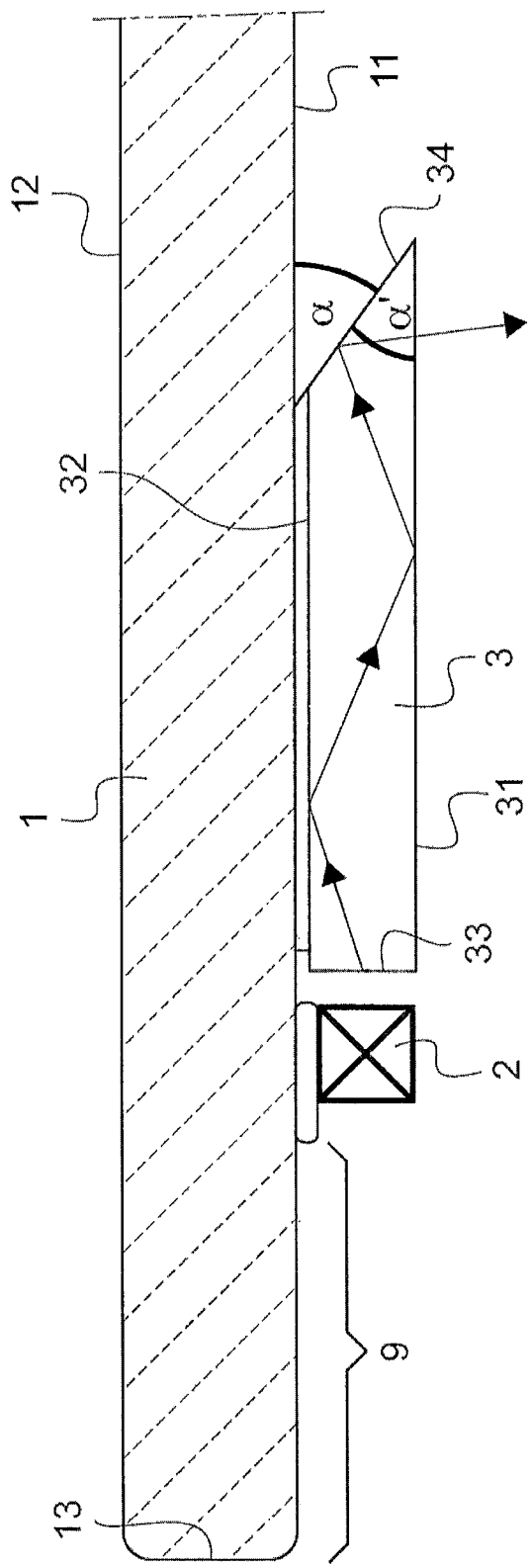

ILLUMINATED GLASS PANEL

CROSS-REFERENCE TO RELATED APPLICATIONS

This application is the U.S. National Stage of PCT/FR2013/052045, filed Sep. 5, 2013, which in turn claims priority to French Application No. 1258312, filed Sep. 6, 2012. The contents of all of these applications are incorporated herein by reference in their entirety.

The present invention relates to a lighting glazing, in particular a motor vehicle glazing, capable of emitting light in an oriented manner.

It is known practice to incorporate light-emitting diode modules (LED modules) at the edge of single-sheet or laminated glazings, so that the light emitted by the LEDs enters through the rim of a sheet of glass and is guided thereby to a diffusing element, also called light extraction means.

These lighting glazings often have an ambient lighting function. The light extraction means in fact diffuses the light, extracted from the lit sheet, without distinction in all directions. In some cases, it may however be desirable, or even necessary, to limit the diffusion angle of the extracted light. That is the case for example in the building domain, when there is a desire to light a particular decorative element in order to show it to its best advantage, or even in the automobile domain when there is a desire to light an area of the passenger compartment, in proximity to a passenger, without causing a nuisance to the other passengers, and in particular the driver.

It would of course be possible to consider orienting the diffuse light, extracted from the waveguide sheet, by a deflector fixed to one of the faces of the lit sheet in proximity to the diffusing element. Such a solution would, however, be unsatisfactory from an esthetic viewpoint because such a deflector, which is opaque, would protrude from the glazing and would significantly degrade the impression of flatness and of transparency of the glazing when the light source is off.

The present invention is based on the idea of replacing the diffusing light extraction means with a flat waveguide comprising a beveled rim, fixed at the edge of the glazing. This beveled rim, when it receives the light injected through the rim opposite it reflects it by deflecting it. The reduction of the angle of incidence on the main surfaces of the waveguide which results therefrom enables the light to leave the waveguide. When this reflection by the beveled rim is mostly of specular type, it makes it possible to orient the light in a certain direction rather than diffuse it across a very wide angle.

The application DE 10 2007 013 627 discloses a lamp for lighting the passenger compartment of a motor vehicle. This lamp comprises a light source (2) coupled to an actuation system (3) comprising an optical emitter (5), an optical receiver (13) and a flat waveguide. The passenger compartment is lit directly by the light source, different from the optical emitter, whereas the flat waveguide receiving the radiation from the optical emitter forms part of the actuation system. It can reasonably be assumed that the radiation injected by the optical emitter into the waveguide is located in a wavelength range invisible to the human eye, such as the infrared. In practice, it is not desirable for visible radiation to be emitted continuously toward the interior of the passenger compartment by a component of the actuation system.

The subject of the present invention is a glazing, preferably a motor vehicle glazing, comprising
- a sheet of transparent glass or plastic with a first main face, a second main face and a rim;
- a flat waveguide with a first main face, a second main face, an injection rim and a beveled rim, opposite the injection rim;
- a light source, preferably a light-emitting diode module (LED module), positioned facing the injection rim of the flat waveguide and having sufficient power to inject therein a light flux of at least 35 lumens (lm), the flat waveguide being fixed via its second main face to the first main face of the sheet of glass.

The light source of the present invention emits a light that is visible to the human eye in the wavelength range between approximately 400 nm and 780 nm.

This light source is preferably capable of emitting a light flux of at least 55 lm, in particular at least 100 lm, and, ideally at least 200 lm. This light flux should be all the greater when the effectiveness of the waveguide (light flux at the output/light flux at the input) is low. It varies as a function of the length of the optical path traveled, of the transparency of the material, and of the quality of the coupling between the light source and the waveguide, and is generally of the order of 20 to 30%.

For a sufficient lighting, the light flux at the waveguide output should be at least 10 lm, preferably between 12 and 40 lm, in particular between 15 and 30 lm.

The sheet of glass or plastic and the waveguide of the glazing of the present invention each have two main faces, essentially parallel to one another. The face intended to be oriented toward the interior of the passenger compartment or of the building will hereinafter be called "first main face" and that which will be directed toward the exterior of the building or of the passenger compartment of the vehicle will hereinafter be called "second main face".

The waveguide is fixed to the sheet of glass in such a way that its second main surface is turned toward the first main surface of the sheet of glass.

The flat waveguide is preferably fixed to the sheet of glass or plastic in such a way that its main plane is substantially parallel to the main plane of the sheet. This fixing can be done, for example, by gluing, or else the edges of the sheet and of the flat waveguide can be held together by a clamping device or by encapsulation. The adhesive used for the gluing is preferably transparent and exhibits a refractive index less than that of the waveguide.

The bevel of the waveguide is such that the acute angle ($\alpha$) corresponds to the angle formed by the rim with the first main face of the waveguide. In other words, the point of the bevel is not in contact with the first main face of the sheet (see FIG. 1).

The value of the acute angle ($\alpha$) formed by the beveled rim with the first main surface of the waveguide is between 10° and 80°, preferably between 20° and 60°, in particular between 25° and 55°. When the waveguide is parallel to the plane of the sheet of glass, this angle $\alpha$ is equal to the angle $\alpha'$ that the beveled rim of the waveguide forms with the first main face of the sheet of glass.

In one embodiment, the beveled rim of the waveguide is covered with a reflecting coating.

The technical effect sought by the present invention is, however, also achieved, to a lesser degree, in the absence of such a reflecting coating. In practice, since the optical index of air is substantially equal to 1 and the optical index of the waveguide is significantly greater than 1, any ray of light arriving from the interior of the guide on the beveled rim with an angle of incidence θ greater than a given value $θ_1$ is reflected by said rim (Snell-Descartes law). The absence of reflecting coating on the beveled rim does, however, result in the refraction of a certain fraction of the light ($θ<θ_1$) which is thus lost for a targeted reorientation. This refracted fraction depends on the value of the angle formed by the beveled rim relative to the main plane of the waveguide: the more acute the bevel, that is to say the smaller the angle α, the smaller the fraction of light lost by refraction and the less useful it is for a reflecting coating to be present on the beveled rim.

The reflecting coating is preferably a metallic coating. When this metallic coating is sufficiently thick to be opaque to the guided light, its presence eliminates the loss of light by refraction and thus maximizes the fraction of light reflected. Metals with high reflectivity will preferably be used, for example layers based on silver, nickel, chrome, iron, copper and/or aluminum.

In one embodiment, this reflecting coating covering the surface of the beveled rim extends also at least over a part of the second main face of the flat waveguide.

The beveled rim preferably has a sufficiently low roughness for the reflection of the light injected through the injection rim and guided by the waveguide to be mostly specular.

In one embodiment, the beveled rim can have a convex or concave curvature or else a texturing of Fresnel lens type, optically equivalent to such a curvature. A beveled rim having a slight curvature advantageously makes it possible to focus or disperse the reflected light.

The flat waveguide can in principle be made of any material exhibiting a low light absorption coefficient. Preferred transparent materials that can be cited include mineral glass or plastic materials, in particular polycarbonate (PC), poly(methyl methacrylate) (PMMA) or cyclo-olefin copolymers (COC).

The flat waveguide is an added-on element fixed in proximity to the periphery of the first sheet, preferably in such a way that the injection rim is parallel to the rim of the sheet of glass.

The width of the waveguide (distance between the injection rim and the point of the beveled rim) is generally fairly limited compared to the dimensions of the sheet. One of the main advantages of the glazing of the present invention lies in the fact that the optical path that the light travels in the waveguide, before being reflected and ejected, is relatively short. The width of the waveguide is consequently preferably between 3 and 40 cm, in particular between 5 and 30 cm and ideally between 7 and 20 cm.

In a particularly interesting embodiment of the glazing of the present invention, the sheet of glass or plastic is made of a tinted material and the waveguide is made of a colorless transparent material.

As already mentioned above, the injection rim of the flat waveguide is substantially parallel to the rim of the sheet. The two rims are preferably offset relative to one another, so as to leave, on the first main face of the sheet, a free strip for fixing the LED modules in proximity to the injection rim of the waveguide, and/or for gluing the glazing to the bodywork of the vehicle.

This free strip between the injection rim of the waveguide and the rim of the sheet preferably has a width of between 1 and 10 cm, in particular between 3 and 8 cm.

The flat waveguide can also comprise one or more diffusing elements situated between the injection rim and the beveled rim. This diffusion element can be situated on the first main face of the waveguide (for example a frosted area or a layer of translucent diffusing enamel),
on the second main face of the waveguide (for example a frosted area or a layer of translucent or non-translucent diffusing enamel), or
in the thickness of the waveguide (for example particles or fibrous elements).

The presence of such a diffusing element would make it possible to diffuse a portion of the light, injected from the LEDs, so as to create an ambient lighting, the fraction of non-diffused light being oriented in a more targeted manner by the beveled rim (specular reflection).

Another subject of the present invention is a vehicle, preferably a motor vehicle, comprising a glazing as described above, the lighting glazing preferably forming part of the roof of the vehicle.

FIG. 1 is a schematic representation, in cross section, of the edge of a glazing according to the invention. This glazing comprises a sheet 1 of glass with a first main face 11 directed toward the interior of the vehicle, a second main face 12 directed toward the exterior of the vehicle and a rim 13. On the first main face 11 of the sheet 1, there is glued a flat waveguide 3 which also has a first main face 31, a second main face 32 and a rim 33. The rim 33 of the waveguide and the rim 13 of the sheet are substantially parallel to one another. The waveguide 3 has a beveled rim 34 opposite the light injection rim 33. The acute angle α formed by the beveled rim 34 with the first main surface 31 of the waveguide is equal to the angle α' between the beveled rim and the first main surface 11 of the sheet of glass. A light source 2 is situated in immediate proximity to the injection rim 33 in such a way that the light emitted by the light source is injected via the injection rim 33, guided between the first and second main faces 31, 32 of the waveguide 3 and reflected by the beveled rim 34. The waveguide and the light source 2 are fixed to the sheet of glass in such a way as to leave an area 9 free for the application of an adhesive seal (not represented) intended to glue the glazing to the bodywork (not represented) of the vehicle.

The invention claimed is:
1. A glazing comprising:
a sheet of transparent glass with a first main face, a second main face, the first and second main faces being parallel to each other, and a rim;
a flat waveguide with a first face, a second face, an injection rim and a beveled rim, opposite the injection rim;
a light source positioned facing the injection rim of the flat waveguide and having sufficient power to inject therein a light flux of at least 35 lumens (lm),
the flat waveguide being fixed via the second face to the first main face of the sheet of transparent glass to provide an assembly that is transparent from the first face of the flat waveguide to the second main face of the sheet,
wherein the injection rim of the flat waveguide and the rim of the sheet of transparent glass are offset relative to one another so that the light source is directly attached to the first main face of the sheet of transparent glass between the injection rim of the flat waveguide and the rim of the sheet of transparent glass,
wherein the beveled rim and the first face of the flat waveguide form a point with an acute angle of between 10° and 80°,
wherein the beveled rim is arranged to face the first main face of the sheet, and wherein a width of the beveled rim extends from the first face to the second face of the flat waveguide and the beveled rim remains beveled along said width of the beveled rim.

2. The glazing as claimed in claim 1, wherein the light source is capable of emitting a light flux of at least 55 lm.

3. The glazing as claimed in claim 1, wherein the light flux at an output of the flat waveguide is at least 10 lm.

4. The glazing as claimed in claim 1, wherein the flat waveguide is made of glass or of plastic material.

5. The glazing as claimed in claim 1, wherein the injection rim of the flat waveguide is substantially parallel to the rim of the sheet.

6. The glazing as claimed in claim 1, further comprising one or more diffusing elements situated, between the injection rim and the beveled rim, on the first face, on the second face or in a thickness of the flat waveguide.

7. The glazing as claimed in claim 1, wherein the glazing is a motor vehicle glazing.

8. A vehicle comprising a glazing as claimed in claim 1.

9. The vehicle as claimed in claim 8, wherein the glazing forms part of a roof of the vehicle.

10. The glazing as claimed in claim 2, wherein the light flux is of at least 100 lm.

11. The glazing as claimed in claim 10, wherein the light flux is of at least 200 lm.

12. The glazing as claimed in claim 3, wherein the light flux at the output of the flat waveguide is between 12 and 40 lm.

13. The glazing as claimed in claim 12, wherein the light flux at the output of the flat waveguide is between 15 and 30 lm.

14. The glazing as claimed in claim 1, wherein the acute angle is between 20° and 60°.

15. The glazing as claimed in claim 14, wherein the acute angle is between 25° and 55°.

16. The glazing as claimed in claim 4, wherein the flat waveguide is made of polycarbonate (PC), of poly(methyl methacrylate) (PMMA) or of cyclo-olefin copolymer (COC).

17. The vehicle as claimed in claim 8, wherein the vehicle is a motor vehicle.

18. The glazing as claimed in claim 1, wherein the injection rim of the flat waveguide and the rim of the sheet of transparent glass are offset relative to one another so that a distance between the injection rim and the rim is between 1 and 10 cm.

19. The glazing as claimed in claim 18, wherein the distance is between 3 and 8 cm.

20. The glazing as claimed in claim 1, wherein the flat waveguide is fixed to the first main face of the sheet of transparent glass by gluing.

21. The glazing as claimed in claim 1, wherein a width of the flat waveguide from the injection rim to the beveled rim is smaller than a width of the sheet of transparent glass from the rim to another rim, opposite said rim, of the sheet of transparent glass.

22. The glazing as claimed in claim 1, wherein said rim defines a periphery of the sheet of transparent glass, wherein a width of the flat waveguide extending from the injection rim to the beveled rim is smaller than a width of the sheet of transparent glass extending from a first part of the rim to a second part of the rim that is opposite the first part of the rim so that each of the injection rim and the beveled rim is offset relative to each of the first and second parts of the rim of the sheet of transparent glass.

23. The glazing as claimed in claim 22, wherein the width of the flat waveguide is between 3 and 40 cm.

24. The glazing as claimed in claim 23, wherein the width of the flat waveguide is between 5 and 30 cm.

25. The glazing as claimed in claim 24, wherein the width of the flat waveguide is between 7 and 20 cm.

26. The glazing as claimed in claim 22, wherein a width of the second face of the flat waveguide extending from the injection rim to the beveled rim is less than half of the width of the sheet of transparent glass.

* * * * *